(12) United States Patent
Parker et al.

(10) Patent No.: US 6,380,309 B1
(45) Date of Patent: Apr. 30, 2002

(54) SYNTHETIC CONSTRUCTION MATTING

(76) Inventors: R. S. Parker, P.O. Box 32214, Lafayette, LA (US) 70593-2214; E. E. Holden, Jr., 505 Montrose, Lafayette, LA (US) 70503; Mark L. Phillips, P.O. Box 52164, Lafayette, LA (US) 70505

( * ) Notice: Subject to any disclaimer, the term of this patent is extended or adjusted under 35 U.S.C. 154(b) by 0 days.

(21) Appl. No.: 09/628,909

(22) Filed: Jul. 31, 2000

(51) Int. Cl.7 .................................................. E01C 9/08
(52) U.S. Cl. ...................... 525/166; 525/92 F; 525/98; 525/177; 525/240; 404/35
(58) Field of Search ................................ 525/166, 177, 525/240, 92 F, 98; 404/35, 44

(56) References Cited

U.S. PATENT DOCUMENTS

| | | |
|---|---|---|
| 4,244,841 A | 1/1981 | Frankland |
| 4,851,500 A | 7/1989 | Lalwani |
| 5,030,662 A | 7/1991 | Banerjie |
| 5,439,735 A | 8/1995 | Jamison |
| 5,653,551 A | 8/1997 | Seaux |
| 5,759,680 A | 6/1998 | Brooks |
| 5,783,286 A * | 7/1998 | DiNicola .................... 428/188 |
| 5,886,078 A | 3/1999 | Sullivan |

* cited by examiner

*Primary Examiner*—Patricia A. Short
(74) *Attorney, Agent, or Firm*—William W. Stagg

(57) ABSTRACT

A method of producing a synthetic structural material for use in constructing mats for temporary roads and access areas. The matting is formed from extruded synthetic structural members formed from a blend comprising HDPE; SBR in an amount less than 4.0 percent by weight of the blend; and PET. Extruded structural members so produced have low electrostatic properties with a desired structural flexibility and resistance to retained memory after loading.

17 Claims, No Drawings

SYNTHETIC CONSTRUCTION MATTING

FIELD OF INVENTION

The present invention relates to materials used in fabricating temporary access mats and matting systems and, more particularly, presents a unique formulation of synethetic materials for use in constructing matting for use as temporary roads and work surface areas.

BACKGROUND OF THE INVENTION

Wooden mats have tradionally been utilized in the oil and gas and construction industries to form temporary roads and access areas at drill site locations and other construction sites. The temporary roads and access areas are formed by laying individual wooden mats in a desired pattern. This pattern of individual mats provide access over and around work areas with poor soil conditions that would otherwise be inaccessible to heavy trucks and construction equipment. When the drilling or construction is completed these mats can be removed for utilization elsewhere.

The use of wooden mats present certain disadvantages. The mats are typically made of layers of wood timbers spiked or bolted together. The timbers forming the mats are subject of splitting, warping, breakage and disposal in compliance with state and federal regulations. Mats having split, broken or warped surfaces can produce imperfections in the matted surfaces that impede the access of the heavy equipment or cause damage to the equipment. The wooden mats used to form the matted surfaces are also expensive, require substantial maintenance, and increase the demand on forests that produce timber and timber products. Wooden mats are also heavy and can be difficult to move, place and store.

Applicants' herein propose a temporary construction mat for use in matting systems formed from a unique combination of synthetic structural materials. U.S. Pat. No. 5,653,551 to Seaux suggests a mat system having individual mats comprised of composite materials. Seaux proposes a combination of virgin resins, plastics, reclaimed polyolefins and vulcanized rubber in further combination with strengthening agents such as fiberglass, steel, graphite, nylon or combinations of the materials. However, the Seaux patent makes no suggestion as to a preferred proportion or combination of such composite materials to be used in forming the mat.

There are problems associated with the use of synthetic materials to form construction matting. Construction matting is subjected to heavy vehicle loads more often than not in areas of poor soil conditions. Mats must be sufficiently rigid to distribute the vehicle loading over the matted area. Mats composed of synthetic materials, when subjected to loading, often have a pronounced deflection due to the characteristics of the materials from which the mat is formed. Such mats often retain too much "memory" from this deflection creating a permanent deformation in the matting. This retained memory or deformation impedes the mats ability to distribute the traffic loads to the soil surface. Further, the use of synthetic materials in matting may create enhanced electrostatic properties causing sparking with an increased risk of explosion. Mats constructed from structural members made with certain synthetic materials may also present problems due to separation of component parts of the mat when conventional fasteners such as screws, spikes or bolts are used to secure the mat components together. The Seaux patent does not present a formulation of synthetic materials to address these problems.

Others have suggested the use of synthentic materials, particularly waste plastics and elastomers, for making construction materials. Examples of such are described in U.S. Pat. No. 5,030,662 to Banerjie and in U.S. Pat. No. 5,759,680 to Brooks. Both the Banerjie and Brooks patents primarily feature the use of various polyethylenes as the bulk of the matrix forming structural member. The Banerjie patent teaches the use of polyolefins in conjunction with compatibilizers, impact modifiers and reinforcing agents in the matrix forming the structural member. The Brooks patent teaches the use of polyolefins in conjunction with cellulosic fibers in the matrix of the structural member. Neither presents a formulation of synthetic materials to address the aforementioned problems presented when such materials are used in construction matting.

Scrap rubber has also been suggested for use as a component in the formulation of synthetic building materials. In U.S. Pat. No. 5,439,735 to Jamison rubber is suggested as a component material for particle board products, because of its resistance to decay, water, rot, insects, and its thermal and acoustic properties.

In U.S. Pat. No. 4,244,841 to Frankland a method of using grindings of scrap tire rubber is proposed for producing structures such as paving stones, floor coverings, resilient bumpers for highway guardrails, and railroad tie pads. In U.S. Pat. No. 4,851,500 to Lalwani teaches a process for blending scrap as a component of the material used in making roofing, walkway pads, and tiles. U.S. Pat. No. 5,886,078 to Sullivan et al. discloses the use of polymeric composites comprising thermoplastic polyolefins, a rubbery polymeric component, and reinforcing filler as a replacement for wood.

None of the aforementioned disclose the unique combination of rubber and synthetic components having the structural and physical properties of flexibility without retaining load memory and low electrostatic characteristics. They were found by applicants to be required for temporary matting to be used in the oil and gas construction industries.

SUMMARY OF INVENTION

The present invention presents a unique formulation for synthetic structural material blended and extruded primarily from high density polyethylene (HDPE), polyethylene terephthalate (PET), and styrene–butadiene rubber (SBR). The unique formulations presented herein, when appropriately specified, offer building materials that are long lived, flexible, without retaining load "memory" and that are resistant to ultraviolet light, ozone, weather, insect and microbial degradation and electrostatic buildup. A further desired characteristic of the structural materials blended and extruded as described and claimed herein, is a material having a desired low electrostatic potential.

The formulations described and claimed herein also impart qualities to the structural members so produced that facilitate their use as construction material as they accommodate the use of traditional tools and traditional fasteners such as spikes, nails, screws and bolts. In addition, the formulations described and claimed result in producing structural materials having excellent compressive, shear and tensile strength, and high moduli of elasticity and rupture as determined by ASTM standard test methods.

While the precise amounts of each of the components above may vary according to the desired properties of the ultimate matrix, and while particle sizes and particle preparation may affect the characteristics of the final product material, it is thought that the formulations instructed herein, within the general range, and percentages of materials described, will achieve the specific listed and desired material characteristics for use as construction matting.

The primary components of HDPE, PET, and SBR can be obtained from virgin materials manufacturers and/or distributors. In addition to component availability through new material suppliers, these components are widely available through recovered materials markets. The reutilization of these polymers is widely recognized to be of paramount importance to conserve energy, landfill space, and other resources given that such materials represent a considerable percentage of the overall waste stream and volumes are generally increasing every year. Although many modern composite materials that specify SBR prefer to utilize "devulcanized" feed stocks owing to their much improved cross-linking/bonding abilities, for most of the applications addressed herein, simple, physical preparations and detail to particle size needs, result in products achieving the desired characteristics.

DESCRIPTION OF PREFERRED EMBODIMENTS

EXAMPLE I

The following component materials were ground to a desired particle size and blended together by weight in the absence of water (i.e., <0.5% by weight) in the following proportions:

TABLE I

| COMPONENT | RANGE OF PREFERRED PERCENTAGE |
| --- | --- |
| HDPE | 0.0–98.0 |
| SBR | 2.0–3.9 |
| PET | 0.0–98.0 |

The components in Table I were mixed in the specified range of percentages. The blend was then heated and extruded into dimensional lumber and then cooled in a water bath. While a precise grinding or gradation of component particles comprising the blend of Table I is not thought to be required, the particle size so blended would be thought to pass a 2.5 cm sieve.

The materials as listed and described in Table I when blended as described produced a synthetic lumber building material with the structural characteristics shown in Table II when tested as indicated:

TABLE II

| PROPERTY | TEST METHOD | RANGE OF VALUES |
| --- | --- | --- |
| Modulus of Elasticity | ASTM D790 | 140,000 psi–183,000 psi |
| Tensile Strength | ASTM D198 | 1,453 psi–1,587 psi |

These synthetic lumber boards produced in accordance with Examples I were then arranged to form a layered mat using conventional screw fasteners. The mat so configured was then placed as a component of a conventional timber matting system for a temporary matting for testing. The matting so produced was subjected to actual load testing and showed good performance without excessive wear, deformation or retained load memory, and without splitting, rotting, or the loosening of the fasteners. Owing to these characteristics, it was shown that mats comprised of synthetic material blended in accordance with Example I are ideal for use as construction matting.

EXAMPLE II

As an alternative embodiment, a combination of at least the following component materials were ground to particle size and blended together by weight in the absence of water (i.e., <0.5%) in the following proportions:

| COMPONENT | RANGE OF PREFERRED PERCENTAGE |
| --- | --- |
| HDPE | >90.0% |
| SBR | <4.0% |

The components in Example II were blended in the specified range of percentages. The blend was then heated and extruded into dimensional lumber and then cooled in a water bath. Materials so blended also produced a synthetic lumber with a desired electrostatic potential and with the a desired structural flexibility and load memory.

EXAMPLE III

As an additional alternative embodiment, a combination of at least the following component materials were ground to particle size and blended together by weight in the absence of water (i.e., <0.5%) in the following proportions:

| COMPONENT | RANGE OF PREFERRED PERCENTAGE |
| --- | --- |
| HDPE | 5.0–75.0 |
| SBR | 2.0–3.9 |
| PET | 0.0–40.0 |

The components in Example III were mixed and blended in the specified range of percentages and then heated and extruded into dimensional lumber and then cooled in a water bath. The components so blended also produced a synthetic lumber with a desired electrostatic potential and with the a desired structural flexibility and load memory.

EXAMPLE IV

Component synthetic materials were ground to a desired particle size and blended together by weight in the absence of water (i.e., <0.5% by weight) in the following proportions:

TABLE I

| COMPONENT | RANGE OF PREFERRED PERCENTAGE |
| --- | --- |
| HDPE | 0.0–95.0 |
| SBR | 5.0–10.0 |
| PET | 0.0–95.0 |

The components in Example IV were mixed and blended in the specified range of percentages and then heated and extruded into dimensional lumber and then cooled in a water bath. The components so blended also produced a synthetic lumber with a desired electrostatic potential but the lumber had a structural flexibility and retained load memory too great to be utilized as a component for temporary matting in the oil and gas and construction industries.

One of significant characteristic of the synthetic lumber boards extruded from the blends in accordance with the above Examples is that the electrostatic potential of the synthetic lumber is lowered by increasing the amounts of SBR. However, the desire to achieve the characteristic of a lower electrostatic potential for the synthetic lumber must be balanced with the resulting increase in flexibility and, consequently, the an increase in the retained "memory" from a deflection or deformation synthetic lumber under loading, imparted when the amounts of SBR utilized in the blend or increased. Applicants' have found that extruded synthetic structural members having a desired electrostatic potential and a desired flexibility with a suitable resistance to retained memory after loading are produced when the percentage of SBR in the components of the synthetic materials forming the blend is kept in the range of 2.0 percent by weight and less than 4.0 percent by weight as describe in Examples I, II and III.

The improvements to the art as specified herein impart qualities to the extruded synthetic lumber such that applications exposed to the environment long out live popular alternatives such as wood and "single component" recovered plastics. In addition, and as a consequence of the lowered electrostatic potential of the formulations, these composite materials outlined herein, can be safely utilized in environments where electrostatic arching must be avoided (i.e., hazardous materials storage areas, oil and gas locations and other potentially explosive/flammable areas).

It is thought that the synthetic structural material and method of the present invention and many of its attendant advantages will be understood from the foregoing descriptions, and it will be apparent that various changes or modifications may be made to the examples presented without departing from the spirit and scope of the invention or sacrificing all of its material advantages, the form described herein being merely a preferred or exemplary embodiment of the invention.

What is claimed is:

1. A method of producing a synthetic structural material for use in constructing mats for temporary roads and access areas, which comprises the step of producing an extruded synthetic structural member comprising primarily:
   (i) synthetic material selected from the group consisting of high density polyethylene and polyethylene terephthalate in an amount not more than 99.0 percent by weight; and
   (ii) styrene-butadiene rubber in the range from 1.0 percent to about 3.5 percent by weight.

2. A method of producing a synthetic structural material for use in constructing mats for temporary roads and access areas as recited in claim 1 wherein, said high density polyethylene, said styrene-butadiene rubber, and said polyethylene terephthalate, when combined, have a water content of less than 0.5 percent by weight.

3. A method of producing a synthetic structural material for use in constructing mats for temporary roads and access areas as recited in claim 2 wherein, said range of styrene-butadiene rubber is from 2.0 percent to 3.5 percent by weight.

4. A method of producing a synthetic structural material for use in constructing mats for temporary roads and access areas, which comprises the step of producing an extruded synthetic structural member comprising:
   (i) high density polyethylene in an amount greater than 90.0 percent by weight; and
   (ii) styrene-butadiene rubber in an amount from 1.0 percent to 3.5 percent by weight.

5. The method of producing a synthetic structural material for use in constructing mats for temporary roads and access areas as recited in claim 4 wherein, said high density polyethylene and said styrene-butadiene rubber, when combined, have a water content of less than 0.5 percent by weight.

6. The method of producing a synthetic structural material for use in constructing mats for temporary roads and access areas, which comprises the step of producing an extruded synthetic structural member comprising primarily:
   (i) high density polyethylene in an amount not more than 75.0 precent by weight;
   (ii) styrene-butadiene rubber in the range from 2.0 percent to 3.5 percent by weight; and
   (iii) polyethylene terephthalate in an amount not more than 40.0 percent by weight.

7. The method of producing a synthetic structural material for use in constructing mats for temporary roads and access areas as recited in claim 6 wherein, said high density polyethylene, said styrene-butadiene rubber, and said polyethylene terephthalate, when combined, have a water content of less than 0.5 percent by weight.

8. A method of producing extruded synthetic lumber comprising the steps of:
   (i) first, providing a blend of ground synthetic particles, said blend comprising primarily synthetic material, selected from the group consisting of ground high density polyethylene particles and ground polyethylene terephthalate particles in an amount not more than 99.0 percent by weight of said blend and ground styrene-butadiene rubber particles in an amount from 1.0 percent to about 3.5 percent by weight of said blend;
   (ii) next, mixing said blend;
   (iii) then, heating said blend; and
   (iv) extruding said blend into dimensional lumber; and
   (v) then cooling said extruded dimensional lumber.

9. The method of producing extruded synthetic lumber as recited in claim 8 wherein, said blend has a water content of less than 0.5 percent by weight.

10. The method of producing extruded synthetic lumber as recited in claim 9 wherein, said range of said ground styrene-butadiene rubber particles is from 2.0 percent to 3.5 percent by weight.

11. The method as recited in claim 10 wherein said particles of said blend of ground synthetic particles are sized to pass a 2.5 cm sieve.

12. A method of producing synthetic mats for temporary roads and access areas, which comprises the step of producing an extruded synthetic structural member from a blend of synthetic material, said blend of synthetic material comprising:
   (i) high density polyethylene in an amount greater than 90.0 percent by weight;
   (ii) styrene-butadiene rubber in an amount from 1.0 percent to 3.5 percent by weight; and
   (iii) polyethylene terephthalate as a filler.

13. The method as recited in claim 12 wherein said blend of synthetic material has a water content of less than 0.5 percent by weight.

14. The method as recited in claim 12 wherein, in said blend of synthetic material, said high density polyethylene and said polyethylene terephthalate, together, is no more than 99.0 percent by weight of said blend and said styrene-butadiene rubber is in the range from about 1.0 percent to about 3.5 percent by weight of said blend.

15. The method as recited in claim 14 wherein said high density polyethylene, said polyethylene terephthalate, and said styrene-butadiene rubber are produced from recovered materials.

16. The method as recited in claim 15 wherein said step of producing said extruded synthetic structural member from said blend of synthetic material includes the steps of:
   (i) mixing said blend;
   (ii) then, heating said blend;

(iv) then, extruding said blend into dimensional lumber; and (v) then cooling said extruded dimensional lumber.

17. The method as recited in claim 16 wherein said step of producing an extruded synthetic structural member from said blend of synthetic material includes providing said blend comprised of ground particles of said high density polyethylene, said styrene-butadiene rubber, and said polyethylene terephthalate, wherein said ground particles would pass a 2.5 cm sieve.

* * * * *